(12) United States Patent
Huang

(10) Patent No.: US 7,881,053 B1
(45) Date of Patent: Feb. 1, 2011

(54) HEAT-DISSIPATING SEAT FOR NOTEBOOK COMPUTERS

(76) Inventor: Cheng Yu Huang, 3F, 42, Alley 47, Chanshin Road, Taishan, Taipei (TW)

( * ) Notice: Subject to any disclaimer, the term of this patent is extended or adjusted under 35 U.S.C. 154(b) by 62 days.

(21) Appl. No.: 12/503,060

(22) Filed: Jul. 14, 2009

(51) Int. Cl.
*H05K 7/20* (2006.01)
*G12B 15/04* (2006.01)

(52) U.S. Cl. .............................. 361/679.48; 361/679.47; 361/695; 165/80.3; 165/121; 165/122; 165/104.33; 454/184; 248/676; 248/176.1; 248/346.5

(58) Field of Classification Search ............ 361/679.32, 361/679.41, 679.44, 679.45, 679.46–54, 361/690–697, 715, 719–724; 165/80.2, 80.3, 165/80.4, 104.33, 104.34, 121–126, 185; 454/184; 395/281, 283, 750.01, 750.06, 395/750.08, 700; 248/176.1, 346.5, 676; D14/447; 174/15.1, 16.3, 252, 260, 50.52
See application file for complete search history.

(56) References Cited

U.S. PATENT DOCUMENTS

| | | | | |
|---|---|---|---|---|
| 6,094,347 | A * | 7/2000 | Bhatia | 361/695 |
| 6,239,971 | B1 * | 5/2001 | Yu et al. | 361/695 |
| 6,343,010 | B1 * | 1/2002 | Tanaka | 361/679.47 |
| 6,353,536 | B1 * | 3/2002 | Nakamura et al. | 361/679.41 |
| 6,687,123 | B2 * | 2/2004 | Kitahara | 361/695 |
| 6,707,668 | B2 * | 3/2004 | Huang | 361/679.48 |
| 6,738,256 | B2 * | 5/2004 | Hsieh et al. | 361/679.47 |
| 6,781,833 | B2 * | 8/2004 | Lu | 361/695 |
| 6,894,896 | B2 * | 5/2005 | Lin | 361/695 |
| 7,019,968 | B2 * | 3/2006 | Kitahara | 361/695 |
| 7,038,909 | B1 * | 5/2006 | Chen | 361/679.48 |
| 7,177,150 | B2 * | 2/2007 | Kazuhiro | 361/695 |
| D555,162 | S * | 11/2007 | Park et al. | D14/447 |
| 7,301,765 | B2 * | 11/2007 | Huang | 361/695 |
| 7,453,694 | B2 * | 11/2008 | Lee | 361/679.48 |
| 7,532,463 | B2 * | 5/2009 | Jacobs et al. | 361/679.48 |
| 7,800,903 | B2 * | 9/2010 | Wang | 361/695 |
| 2004/0047124 | A1 * | 3/2004 | Hsieh et al. | 361/687 |
| 2009/0002932 | A1 * | 1/2009 | Lord et al. | 361/683 |
| 2009/0179131 | A1 * | 7/2009 | Lord et al. | 248/346.5 |

FOREIGN PATENT DOCUMENTS

CA    CN 201017687 Y  *  2/2008

* cited by examiner

*Primary Examiner*—Michael V Datskovskiy
(74) *Attorney, Agent, or Firm*—Guice Patents PLLC

(57) ABSTRACT

A heat-dissipating seat for exclusive use with notebook computers is provided. A cooling fan is provided in a base plate of the heat-dissipating seat. The base plate is bilaterally provided with retractable extension bars for expanding the base plate. Each of the extension bars has an end fixedly provided with a rotatable leg. The heat-dissipating seat has a compact, intricate design that allows easy portability.

3 Claims, 4 Drawing Sheets

HEAT-DISSIPATING SEAT FOR NOTEBOOK COMPUTERS

BACKGROUND OF THE INVENTION

1. Technical Field

The present invention relates to a heat-dissipating seat for exclusive use with notebook computers, wherein a cooling fan is provided in a base plate of the heat-dissipating seat, and the base plate is bilaterally provided with retractable extension bars for expanding the base plate, and rotatable legs.

2. Description of Related Art

In recent years, notebook computers have been made lighter, smaller, and capable of longer operating hours so as to be truly portable, thanks to joint efforts of engineers in the related fields. In addition, with the prevalence of wireless networking, notebook computers have grown increasingly popular among computer users as notebook computers are now suitable for use anytime and anywhere.

However, due to their structural design, notebook computers have far poorer heat-dissipation capabilities than desktop PCs, server computers, or other IT equipment. Generally, a notebook computer tends to generate more heat on a backside thereof where the hard drive, CPU, and power supply are provided. As a result, accidents caused by the heat accumulation effect of notebook computers were reported from time to time.

In order to solve the heat accumulation problem of notebook computers, the industry have developed heat-dissipating seats for notebook computers that are made of various materials and come in different shapes and sizes. These heat-dissipating seats are configured for supporting notebook computers and enhancing heat dissipation thereof.

A conventional heat-dissipating seat for use with notebook computers is typically designed according to the dimensions of notebook computers and usually has a larger area or volume than notebook computers. Hence, it is inconvenient to carry such bulky and structurally complex heat-dissipating seats along with notebook computers. Besides, the conventional heat-dissipating seats for notebook computers are substantially similar in structure, shape, and size and lack inventive steps.

BRIEF SUMMARY OF THE INVENTION

In view of the shortcomings of the conventional heat-dissipating seats for notebook computers, the present invention provides a novel heat-dissipating seat for notebook computers, wherein a cooling fan is provided in a base plate of the heat-dissipating seat, the base plate is bilaterally provided with retractable extension bars for expanding the base plate, and each of the extension bars has an end fixedly provided with a rotatable leg. The heat-dissipating seat of the present invention is compact and intricate in design and therefore readily portable.

BRIEF DESCRIPTION OF THE SEVERAL VIEWS OF THE DRAWINGS

The invention as well as a preferred mode of use, further objectives, and advantages thereof will be best understood by referring to the following detailed description of an illustrative embodiment in conjunction with the accompanying drawings, wherein.

DETAILED DESCRIPTION OF THE INVENTION

Figure 1:
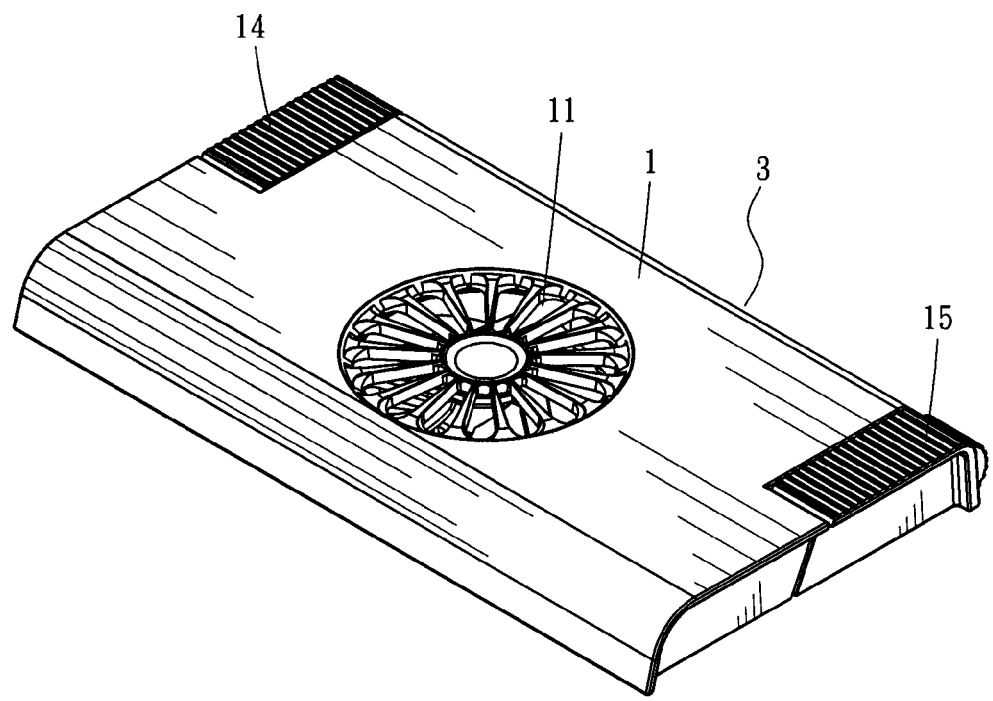
FIG. 1 is a perspective view of a heat-dissipating seat for notebook computers according to the present invention.
Figure 6:
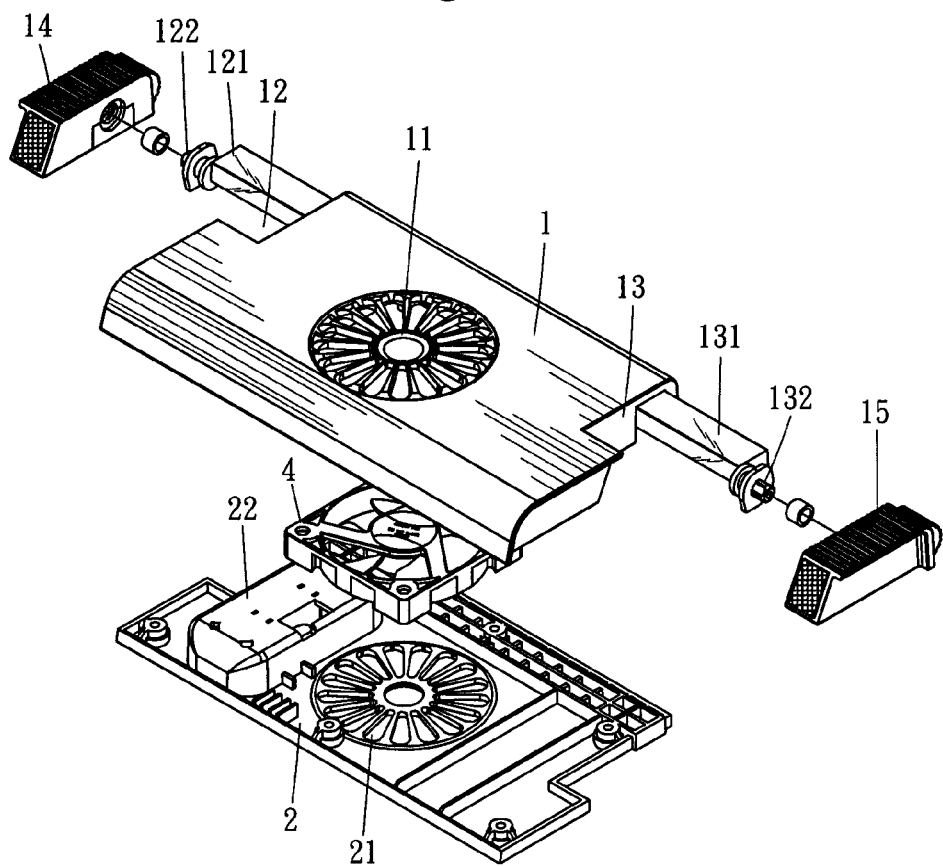
FIG. 6 is an exploded perspective view of the heat-dissipating seat for notebook computers according to the present invention.

Referring to FIG. 1 and FIG. 6, a heat-dissipating seat for notebook computers according to the present invention mainly includes a heat-dissipating base plate 3 formed of an upper housing 1 and a lower housing 2. A cooling fan 4 is fixedly provided in the upper housing 1 and the lower housing 2. In order to facilitate air ventilation and heat dissipation, the upper housing 1 and the lower housing 2 are formed respectively with cooling fan vent holes 11, 21 corresponding in position to the cooling fan 4.

The lower housing 2 is provided with a connection terminal receiving box 22 configured for receiving an USB connection terminal 5 and a power line 51. The USB connection terminal 5 is electrically connected with the cooling fan 4 by means of the power line 51. The USB connection terminal 5 is connectable with a notebook computer 6 so as to provide electric power to the cooling fan 4.

The upper housing 1 has a front edge bilaterally formed with notches 12, 13. Retractable extension bars 121, 131 are provided in the notches 12, 13, respectively. The extension bar 121 has an end provided with an axle 122 while the extension bar 131 has an end provided with an axle 132. The axles 122, 132 are installed with rotatable legs 14, 15, respectively. When the extension bars 121, 131 are retracted, the rotatable legs 14, 15 fit nicely in the notches 12, 13, respectively.

Figure 2:
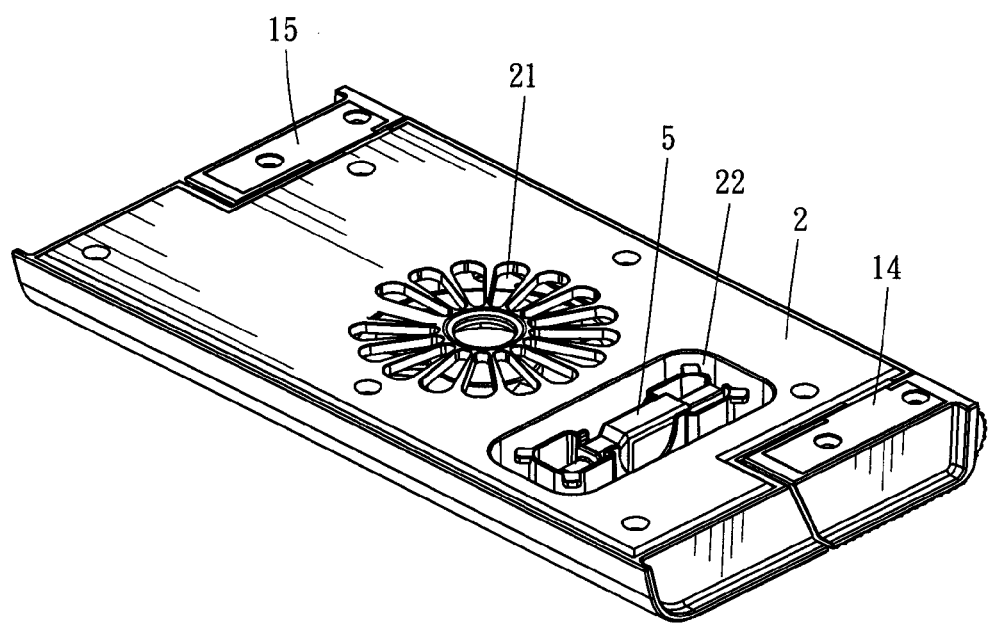
FIG. 2 is a perspective bottom view of the heat-dissipating seat for notebook computers according to the present invention.
Figure 3:
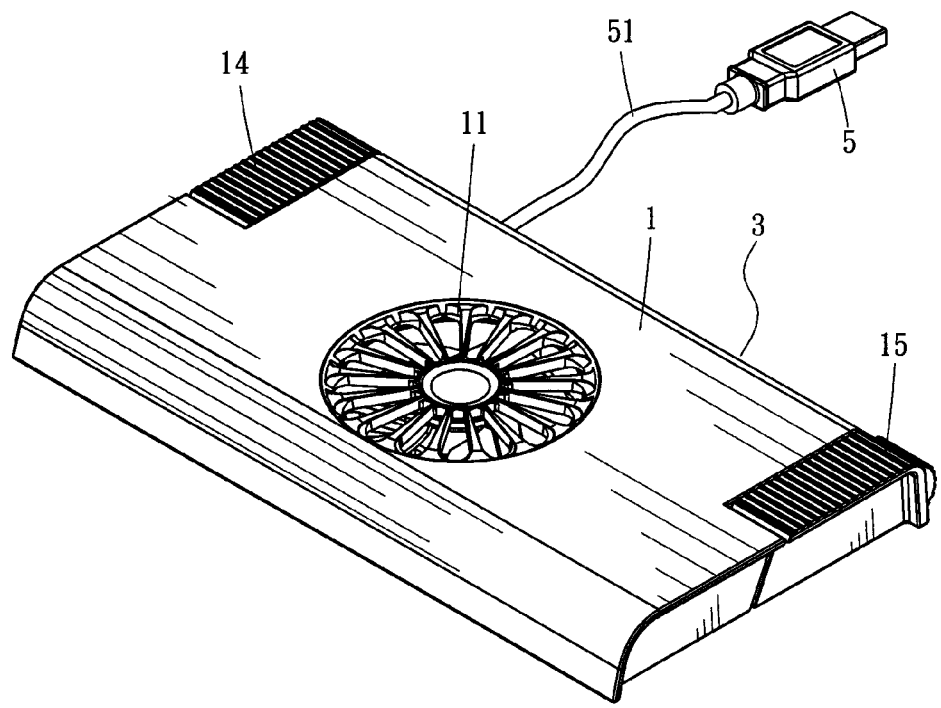
FIG. 3 is another perspective view of the heat-dissipating seat for notebook computers according to the present invention, wherein an USB connection terminal has been extended out.
Figure 4:
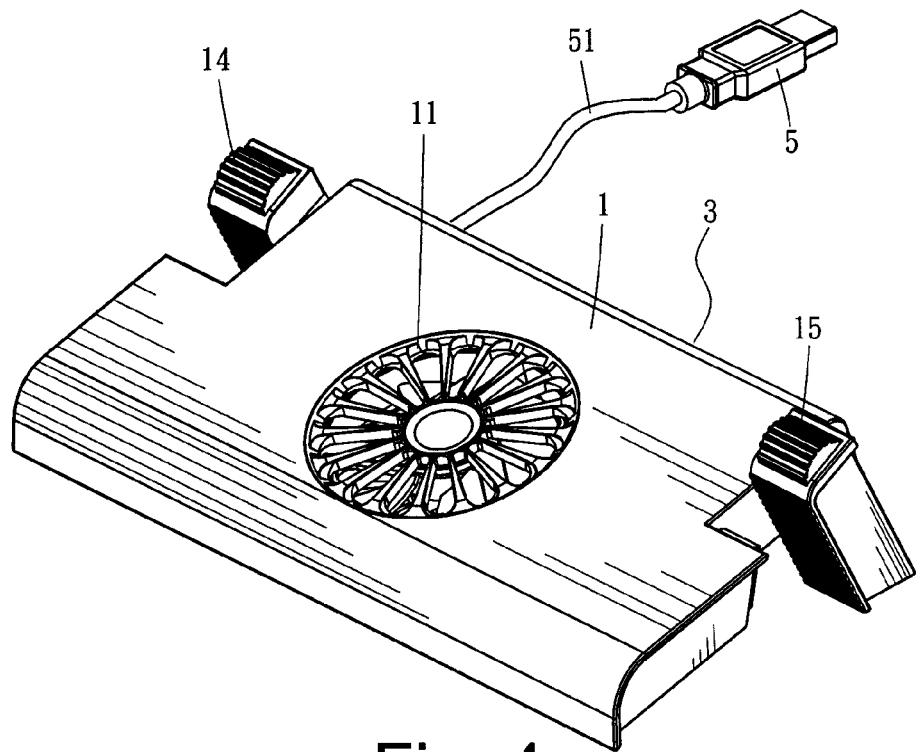
FIG. 4 is yet another perspective view of the heat-dissipating seat for notebook computers according to the present invention, wherein the USB connection terminal has been extended out, and rotatable legs rotated in place.
Figure 7:
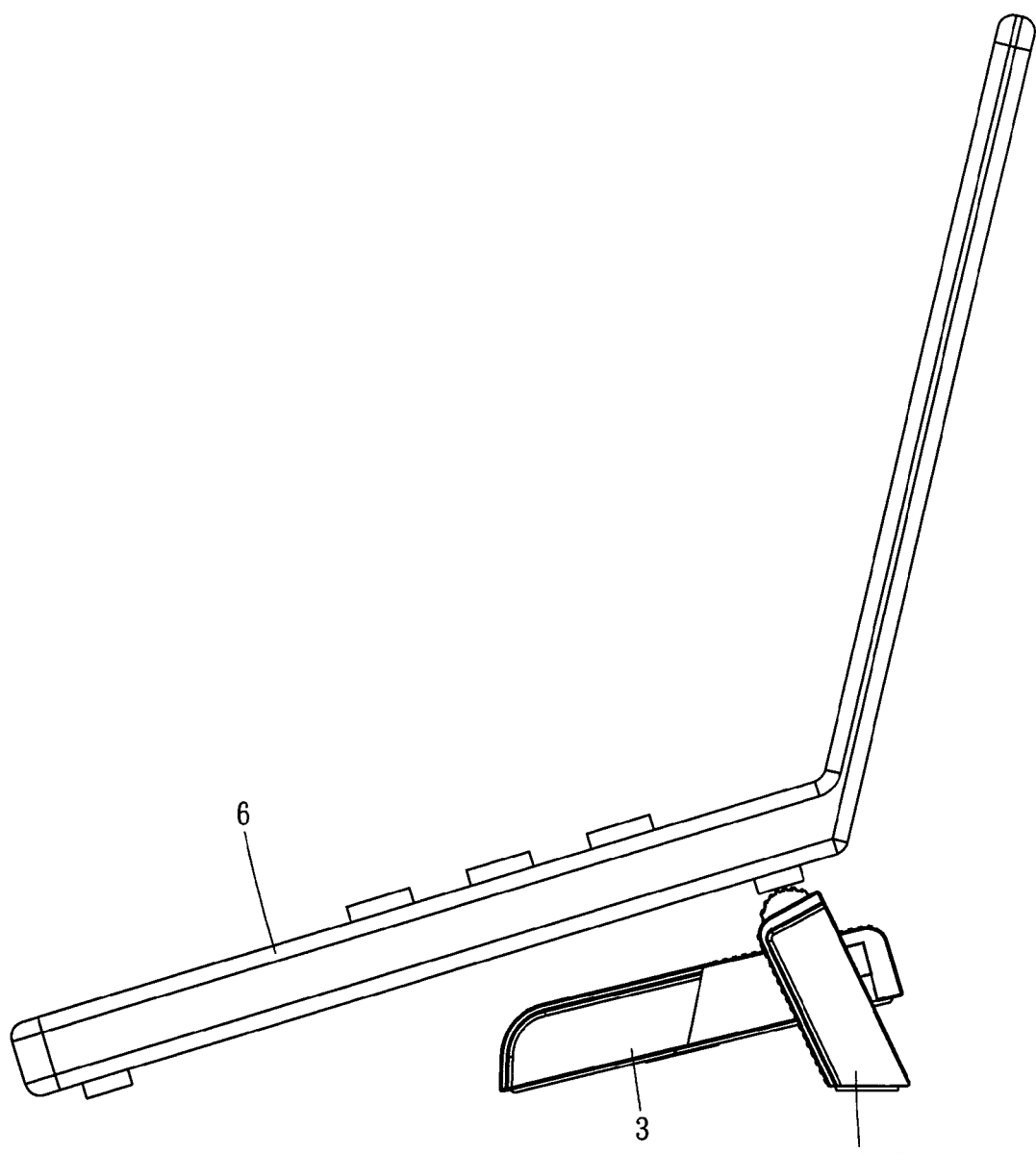
FIG. 7 is a side elevation view of the heat-dissipating seat for notebook computers according to the present invention when used with a notebook computer.

Referring to FIG. 2 and FIG. 3, when the heat-dissipating seat of the present invention is put to use, the USB connection terminal 5 is taken out of the connection terminal receiving box 22 at the lower housing 2 of the heat-dissipating base plate 3 and then connected to an USB connection end of the notebook computer 6. As shown in FIG. 4 and FIG. 7, if the notebook computer 6 is an 8-inch notebook computer, the rotatable legs 14, 15 at the ends of the extension bars 121, 131 are directly rotated in place. Consequently, the heat-dissipating base plate 3 is tilted at an angle to facilitate heat dissipation of the notebook computer 6.

Figure 5:
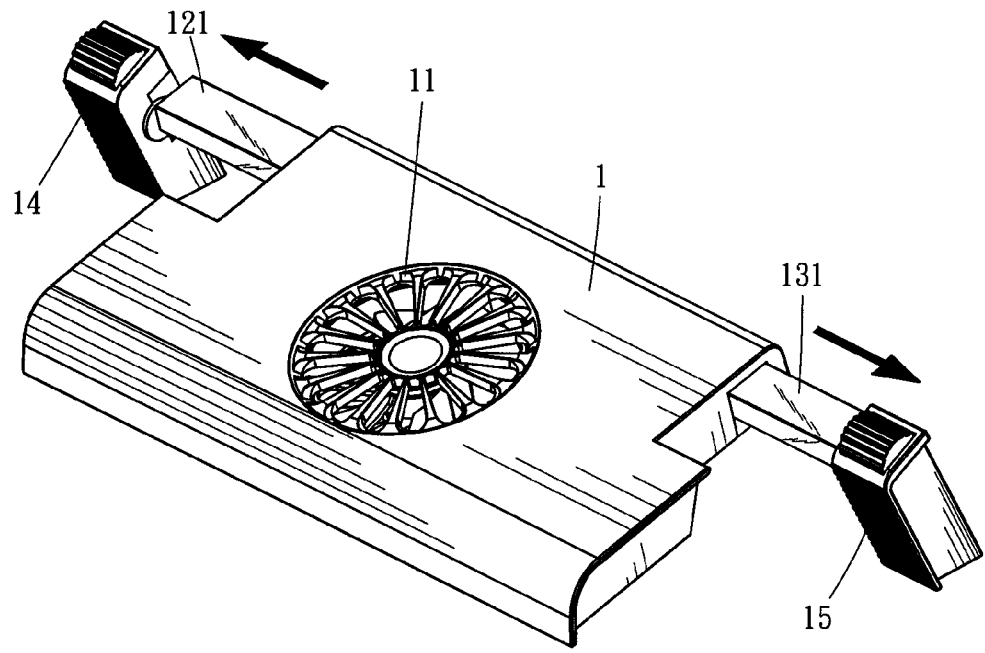
FIG. 5 is still another perspective view of the heat-dissipating seat for notebook computers according to the present invention, wherein a heat-dissipating base plate has been expanded.

With reference to FIG. 5 and FIG. 7, if the notebook computer 6 is a 14-inch notebook computer, the extension bars 121, 131 are extended outward to the sides before the rotatable legs 14, 15 are rotated in place. Thus, the heat-dissipating base plate 3 is tilted at an angle to facilitate heat dissipation of the notebook computer 6.

In short, the heat-dissipating seat of the present invention is suitable for use with notebook computers 6 of different sizes and is highly portable.

What is claimed is:

1. A heat-dissipating seat for notebook computers, the heat-dissipating seat comprising a heat-dissipating base plate formed of an upper housing and a lower housing, the upper housing and the lower housing being provided fixedly therein with a cooling fan, the cooling fan being electrically connected with an USB connection terminal via a power line, the USB connection terminal being connectable to a notebook computer so as to provide electric power to the cooling fan, the upper housing having a front edge bilaterally formed with notches, each said notch being provided with a retractable extension bar, each said extension bar having an end provided with an axle, each said axle being installed with a rotatable leg, the rotatable legs fitting respectively in the notches when the extension bars are retracted.

2. The heat-dissipating seat of claim 1, wherein the upper housing and the lower housing are formed respectively with cooling fan vent holes corresponding in position to the cooling fan.

3. The heat-dissipating seat of claim 1, wherein the lower housing is provided with a connection terminal receiving box for receiving the USB connection terminal and the power line.

\* \* \* \* \*